Figure 1:
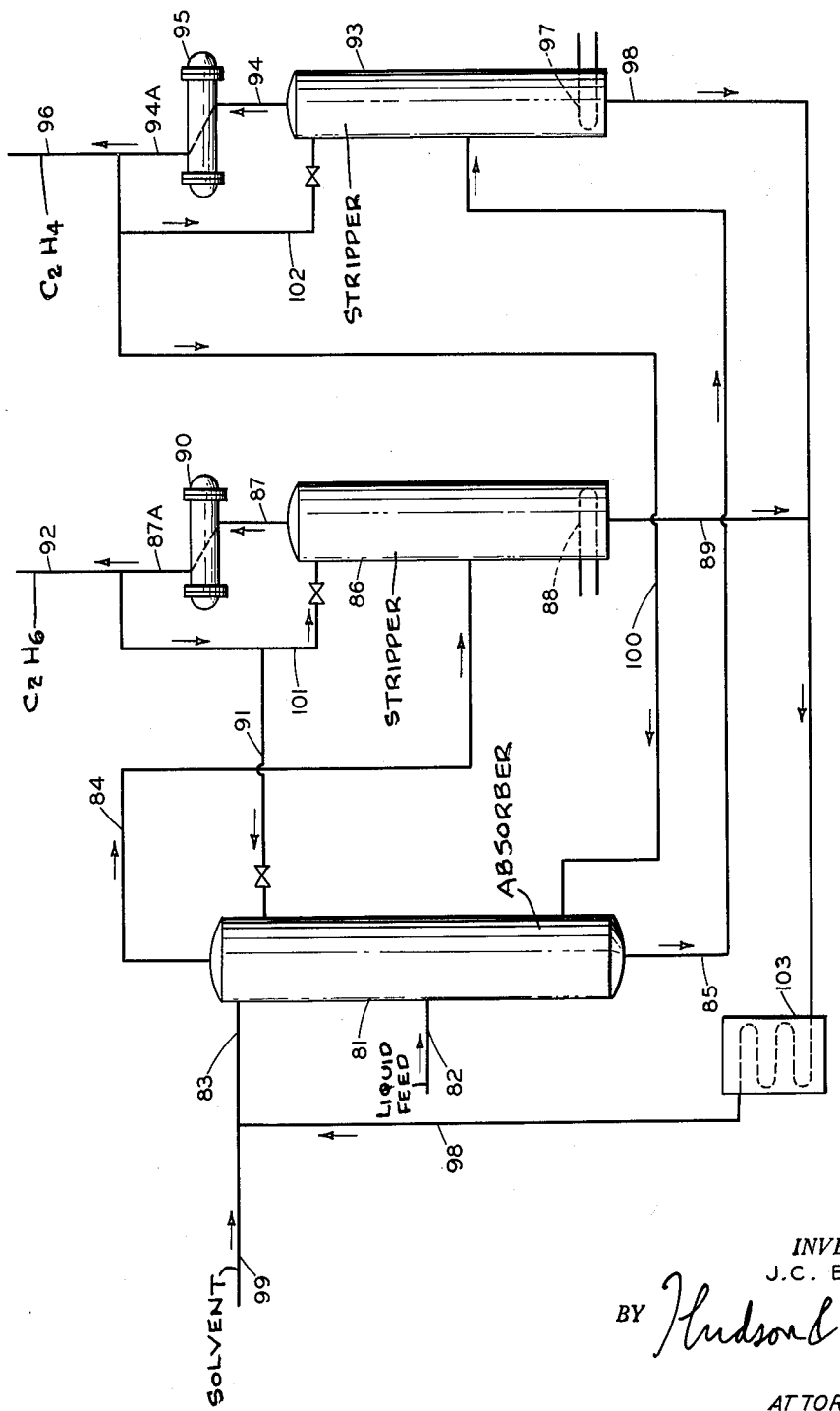

Feb. 28, 1956

J. C. ELGIN 2,736,756

RECOVERY OF ETHYLENE

Filed April 10, 1950

3 Sheets-Sheet 1

INVENTOR.
J.C. ELGIN

BY Hudson & Young

ATTORNEYS

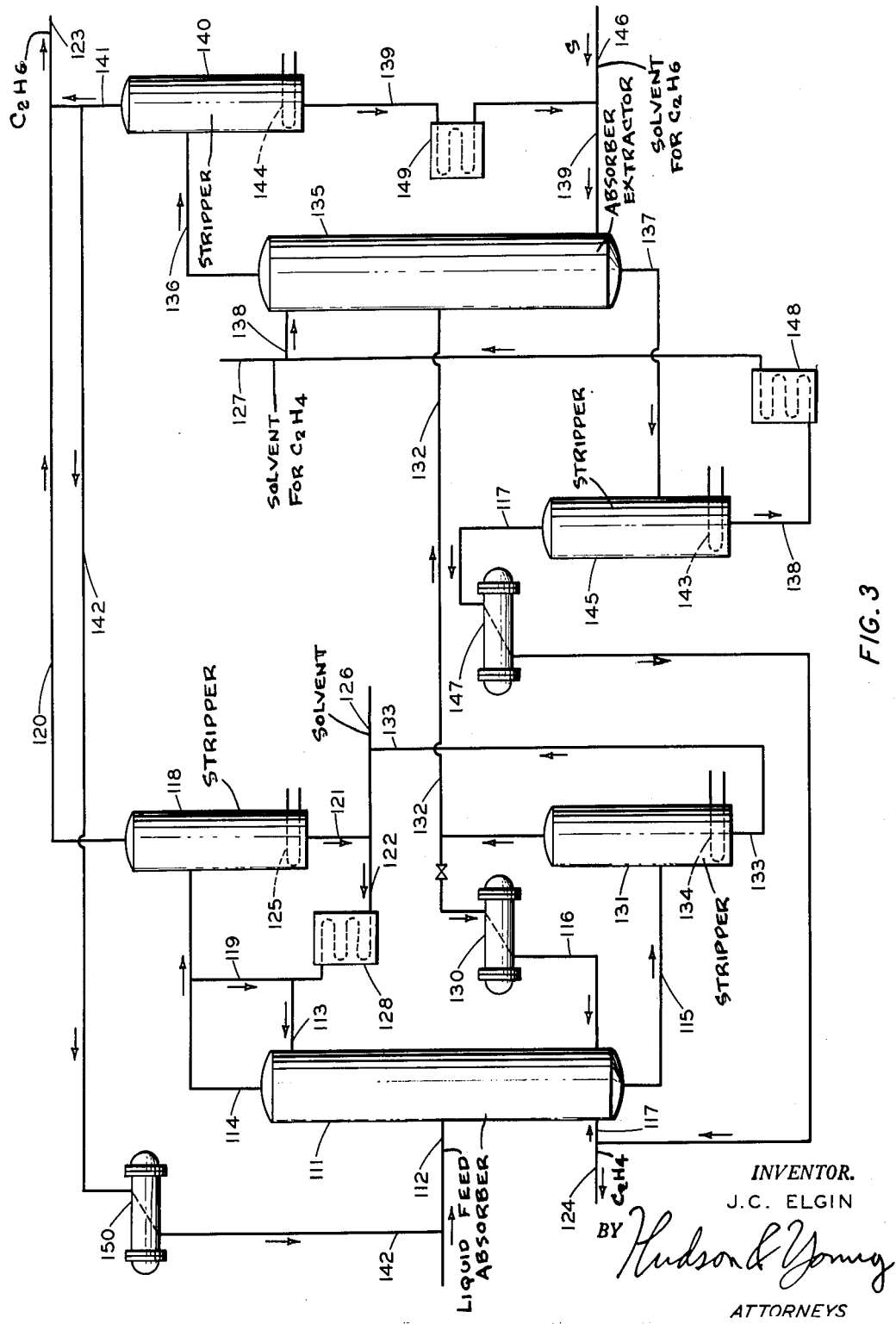

United States Patent Office 2,736,756
Patented Feb. 28, 1956

2,736,756
RECOVERY OF ETHYLENE

Joseph C. Elgin, Princeton, N. J., assignor to Phillips Petroleum Company, a corporation of Delaware Application April 10, 1950, Serial No. 154,992

4 Claims. (Cl. 260—677)

This invention relates to the separation of ethylene from normally gaseous mixtures containing ethylene. In one aspect this invention relates to a method for the separation and recovery of ethylene from admixture with ethane. In another aspect it relates to a method for the separation and recovery of ethylene and of ethane in a state of high purity from mixtures containing these two hydrocarbons. In still another aspect, it relates to a method for the separation and recovery of ethylene from mixtures containing ethylene, ethane, methane, and hydrogen.

An object of my invention is to provide a process for the production of ethylene of a high degree of purity.

Another object of my invention is to provide a process for the separation of ethylene from ethylene containing mixtures.

Still another object of my invention is to provide a process for the separation and recovery of ethylene from ethane and lighter hydrocarbons and hydrogen.

Still another object of my invention is to provide a process for the simultaneous production of ethylene and ethane as pure products from mixtures of ethylene and ethane.

Still another object of my invention is to provide a process for the economical separation and recovery of ethylene from certain gaseous mixtures containing ethylene.

Product streams from petroleum refining, particularly those of certain conversion operations, comprise mixtures of normally gaseous and normally liquid saturated and unsaturated hydrocarbons together with varying amounts of such gases as hydrogen, carbon monoxide, carbon dioxide, hydrogen sulfide, and the like. The components of such streams, particularly the hydrocarbons and hydrogen are useful and valuable materials and numerous processes have been developed for effecting separation into separate components or groups of components. Isolation and recovery of $C_3$ and higher boiling hydrocarbons from such streams are carried out by numerous processes.

The separation of ethane and ethylene from the lighter fraction of these streams and particularly from each other has heretofore involved numerous difficulties. For example, their separation by fractional distillation involves extremely low temperature operation under high pressures, obviously disadvantageous from an economic viewpoint.

Broadly, my invention involves liquid-liquid extraction of ethylene-containing charge stocks with novel solvents which I have found to be selective for ethylene. I have discovered a process for the separation of ethylene from ethylene-ethane streams in which both hydrocarbons are recovered as products of high purity with comparatively simple equipment and correspondingly low operating costs. The ethylene-containing stream is subjected to liquid-liquid extraction using acetonitrile or nitromethane as the extraction solvent. The process of my invention may be applied to hydrocarbon streams containing mixtures of ethylene and ethane, with or without methane and hydrogen.

Since such compounds as ethylene and ethane are normally gases, the ethylene extraction step is carried out under sufficient pressure to maintain liquid conditions in the extraction vessel. The critical temperatures of ethylene, or ethane, or of mixtures of these two hydrocarbons limit the maximum temperature at which the liquid-liquid extraction may be carried out.

Acetonitrile and nitromethane possess exceptionally high selectivity for ethylene over saturated paraffinic hydrocarbons, such as ethane, and I have found that by carrying out the extraction in the liquid state, an ethylene product of high purity and yield can be produced. The apparatus needed for carrying out the liquid-liquid extraction with acetonitrile or with nitromethane is relatively simple and involves mainly a liquid-liquid extraction tower, a raffinate distillation column, and an extract distillation column with connecting lines and such auxiliary equipment as needed.

In one embodiment of my invention, a liquid ethane-ethylene feed stock is contacted with liquid acetonitrile or nitromethane. These solvents are selective for ethylene and the extract phase will be rich in ethylene, while the raffinate phase will contain the ethane. The raffinate phase is stripped in a stripping or distillation zone for removal of the ethane from dissolved solvent. Refluxing the raffinate end of the liquid-liquid extraction zone with some recovered ethane improves the purity of the ethane product. Refluxing the extract or solvent end with some recovered ethylene improves the purity of the ethylene product. The ethylene-rich extract phase is also treated in a stripping zone for recovery of the ethylene. Bottoms from both strippers are recycled to the extraction zone. All or some of the stripped ethylene is condensed and some of the condensate may be recycled to the stripping zone for refluxing purposes, while the remainder is withdrawn as product.

The solvents of my invention are selected on the basis of their high liquid-liquid separation factors and their partial miscibility with liquefied $C_2$ hydrocarbons. The liquid-liquid separation factor is equal to $$\frac{(X'_b)\ (X_a)}{(X'_a)\ (X_b)}$$

where $X'_b$ and $X_b$ are the mol fractions of ethylene in the solvent-rich and hydrocarbon-rich phases, respectively, and $X'_a$ and $X_a$ are the mol fractions of ethane in the solvent-rich and hydrocarbon-rich phases, respectively. Acetonitrile and nitromethane are unique in that they are the only solvents of a large group of ethylene selective materials tested which have these properties combined in a single material. The use of these solvents in a liquid-liquid extraction process has an advantage over separation of ethylene and ethane by a process such as fractionation because of their higher separation factors, especially when operating with higher concentrations of ethylene and also the less severe conditions of temperature and pressure required. A comparison of the liquid-liquid separation factors for acetonitrile and nitromethane in the extraction process and the relative volatility for fractionation are given in the following table.

SEPARATION FACTORS AT 4° F.

| Separation Method | Solvent | Separation Factor | |
| --- | --- | --- | --- |
| | | 10% Ethylene Content[1] | 90% Ethylene Content[1] |
| Liquid-Liquid Extraction | Acetonitrile | 2.2 | 1.5 |
| Do | Nitromethane | 2.8 | 1.7 |
| Fractionation | | 1.7 | 1.2 |

[1] Mol percent ethylene in the hydrocarbon-rich phase on a solvent free basis.

Although the liquid-liquid separation factors for nitromethane exceed those for acetonitrile, the latter is often the preferred solvent because its solvent power for liquid $C_2$ hydrocarbon is 2 to 2.6 times as high as nitromethane.

In the above tabulation the use of separation factors is for comparative purposes and represents approximately the comparative ease of separation by the different processes. A separation factor of 1.0 indicates no separation may be obtained. In the case of fractionation the separation factor is the relative volatility for the system usually called the "$\alpha$" value. For liquid-liquid extraction, the separation factor has been defined in a preceding paragraph.

The solvents, $CH_3CN$ and $CH_3NO_2$, may be used as single solvents or in combination with some other material in the form of a solvent pair. Solvent pairs are pairs of liquid materials, one member being ethylene selective, the other ethane selective. These liquids are substantially immiscible in each other and inert with respect to each other and to components of the stream fed to the process. The pairs are made up on a basis of their separation factors for ethylene and their dissolving capacity. The ideal distribution factor of a solvent pair is the numerical value of the quotient of the solubility ratio for ethylene of the ethylene selective member of the pair divided by that of the ethane selective member. The solubility ratios of the members of my solvent pairs are the numerical values of the quotients of the respective solvent powers of said members for ethylene divided by their solvent powers for ethane under the same conditions of temperature and pressure. The solvent power ($\beta$) of an individual member of a solvent pair at a given temperature and pressure is determined by the following formula:

$$\beta = \frac{cc. \text{ gas (STP)}}{cc. \text{ solvent} \times \text{partial pressure gas (in atmosphere)}}$$

As an example of the derivation of the distribution factor of a solvent pair, the procedure can be illustrated by the specific instance of the system acetonitrile-n-heptane, a preferred solvent pair for use in my process as applied to the ethylene-ethane separation, the values being taken under ideal conditions. The solvent power value ($\beta$) is first determined for each member of the pair for each of the components to be separated, using experimentally determined values in the above equation. The values so obtained at a temperature of 0° C. and a partial pressure of 20 atmospheres are as follows:

| Solvent | $\beta$-$C_2H_4$ | $\beta$-$C_2H_6$ |
|---|---|---|
| Acetonitrile | 4.75 | 3.0 |
| n-Heptane | 6.09 | 20.2 |

From the foregoing values, the solubility ratios are next determined as the quotients of the $\beta$ values for each solvent. The quotient of the solubility ratio of acetonitrile divided by that of n-heptane is the distribution factor. These values are as follows:

| Solvent | Solubility Ratio ($\beta$-$C_2H_4$/$\beta$-$C_2H_6$) | Distribution Factor |
|---|---|---|
| Acetonitrile | 1.582 | |
| n-Heptane | 0.301 | 5.24 |

According to the precepts of my invention, the distribution factor for any solvent pair applicable in my process should have a numerical value of at least 2, and preferably greater than 3, the calculations being based on conditions as hereinbefore described. Obviously the upper limit will be determined by the solvent powers of such materials as otherwise fulfill the requirements for such pairs, since, based on this value alone, efficiency of the process will be enhanced as the separation factor is increased.

Another factor which has an important relationship to the efficiency of my invention is the magnitude of the solvent powers of the individual members of a solvent pair, which is a measure of the dissolving capacity. For example, the pair nitromethane-n-heptane has an ideal distribution factor of 5.61 for the mixture ethane-ethylene, a value greater than that for the system acetonitrile-n-heptane for the same hydrocarbon mixture and determined under the same conditions. However, the solvent power value, ($\beta$) of nitromethane for ethylene is 2.54, appreciably lower than the corresponding value for acetonitrile, (4.75) under the same conditions. Thus while the pair nitromethane-n-heptane is operable in my process, its efficiency will be lower than that for acetonitrile-n-heptane notwithstanding the somewhat higher separation factor.

Acetonitrile and nitromethane may also be used in admixture with small amounts of other liquids such as water to serve as an antisolvent and enhance their selectivity and separation factor for ethylene.

It should be noted that I have found the total dissolving capacity for $C_2$ hydrocarbons of a given weight of a two solvent pair system such as acetonitrile and n-heptane to be considerably greater, under some conditions as much as 80 per cent greater than the same weight of either of the solvents alone. This is apparently due to the dissociation of acetonitrile by n-heptane carried into solution by dissolved ethylene or ethane. This higher capacity is a distinct advantage of the two-solvent distribution process.

In the embodiment of my invention, involving the use of a solvent pair, an ethylene-containing stream which may contain lower boiling materials than $C_2$ hydrocarbons, such as methane and hydrogen, can be contacted with a higher molecular weight saturated paraffinic hydrocarbon as one member of the solvent pair to dissolve the ethane. This ethane rich stream also contains some ethylene and the ethylene is extracted with acetonitrile or nitromethane, the other member of the solvent pair. The apparatus for use in such an extraction system is some more complicated in terms of number of vessels than the aforementioned embodiment. According to this embodiment, a gas stream containing ethane and ethylene, with methane and hydrogen, is contacted with an absorbing liquid such as normal heptane, which is selective for ethane. Other hydrocarbons such as the $C_6$ to $C_9$ paraffins may be used as the absorbing liquid. The normal heptane, however, also absorbs some ethylene, and the rich absorption liquid from such an absorber is liquid-liquid extracted with the ethylene selective solvent of my invention, acetonitrile or nitromethane, for extraction of the ethylene. An extract phase is accordingly produced from which the ethylene may be stripped for removal as a product of the process or for recycling in its entirety or in part in the operation for the production of an ethylene product of higher purity.

In order to recover the major portion of the ethylene in a purity of 95 per cent or higher it is frequently desirable to dissolve substantially all of the ethylene as well as the ethane in the paraffin solvent. The ethane and ethylene contained in the paraffinic solvent may then be separated from each other by liquid-liquid extraction with acetonitrile or nitromethane as described above. In order to obtain both $C_2$ hydrocarbons in high purity, it will of course be necessary to employ both stripping and enriching units.

If the off gas from the normal heptane absorption step contains the bulk of the ethylene and the hydrogen and methane, then this gas is treated for the separation and recovery of the ethylene by any known method such as, for example, by absorption in an ortho-anisdine solution of cuprous chloride. From this absorption solution, the ethylene may be desorbed and recovered in a relatively pure form. Such an ethylene separation and recovery process is described in an application for patent, Serial No. 32,356, filed June 11, 1948.

In a third embodiment, a liquid charge stock containing ethylene and ethane is countercurrently contacted with my ethylene selective solvent, for example, acetonitrile. The nitrile selectively dissolves the ethylene and an extract phase is produced. The raffinate containing the ethane is passed to a stripper which removes the ethane from the small amount of dissolved solvent. This stripped ethane may be condensed or not, as desired, and passed to storage. The extract phase may be stripped for removal of the ethylene and the solvent from the extract is combined with the solvent recovered from the raffinate, and the mixture passed to the contacting zone of the solvent. The stripped ethylene from the extract phase contains some ethane and this gaseous mixture is contacted with a countercurrently flowing "pair" of immiscible solvents. One of these solvents is acetonitrile or nitromethane, and the other is preferably n-heptane or other $C_6$ to $C_9$ paraffin hydrocarbon. The n-heptane is introduced into the contacting zone at the bottom and it rises upward through this zone and dissolves the ethane so that n-heptane rich in ethane is removed from the top of this zone and passed to a stripper. This stripper removes the ethane as a product of the process or for recycling to the contacting zone. The ethylene selective solvent is introduced into the top of the contacting zone and flows downward against the up-flowing n-heptane. The acetonitrile, for example, dissolves the ethylene selectively in this zone and the ethylene-rich solvent is passed to a stripper which separates the ethylene from the nitrile. The nitrile is recycled to the countercurrent contacting zone as the ethylene selective solvent, while the ethylene may be removed as the product of the process or recycled in part to the original contacting zone for refluxing purposes.

Figure 2:
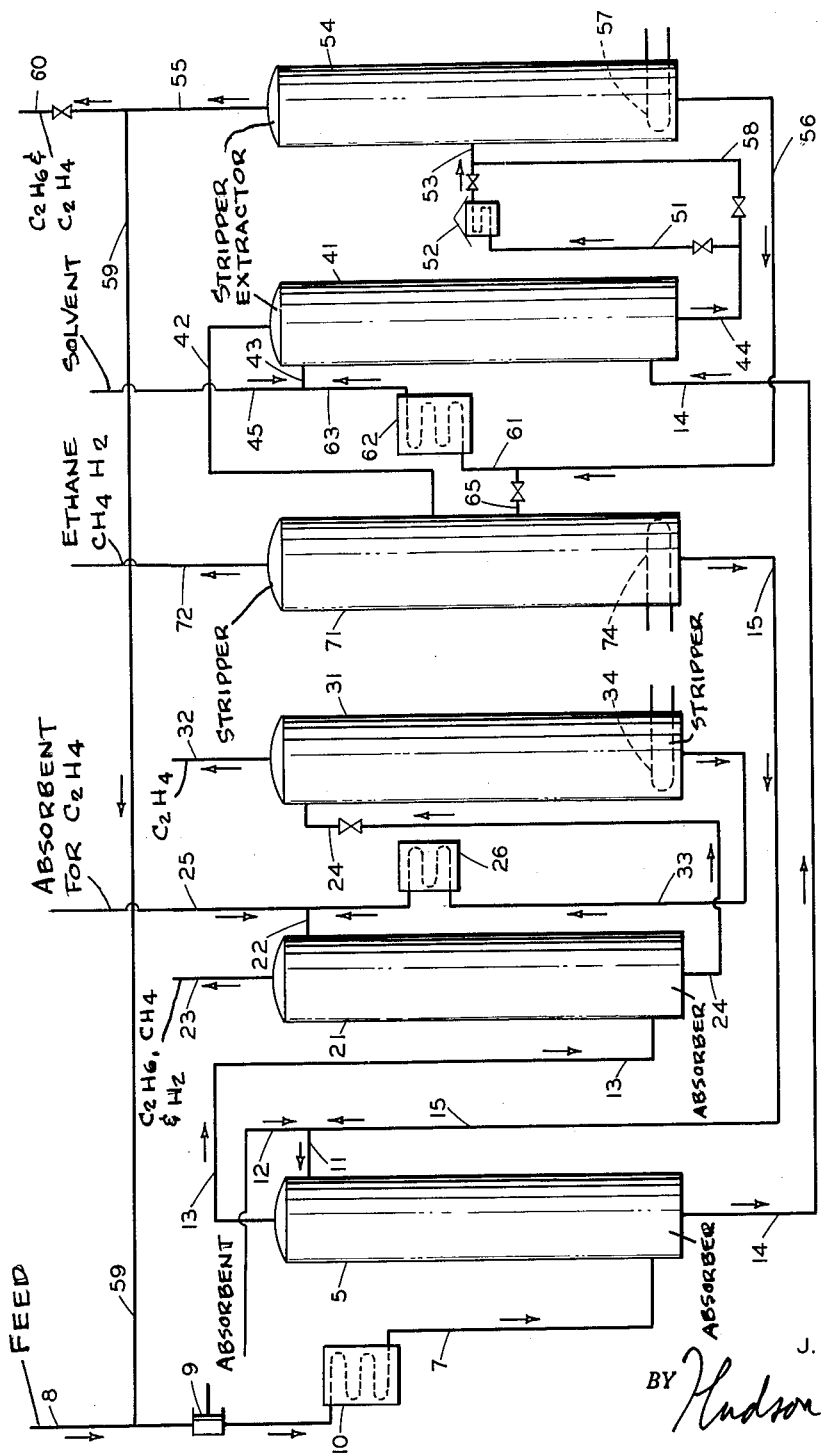

In the drawing, Figure 1 is a diagrammatic representation of one form and sequence of apparatus parts for carrying out the process of my invention. Figure 2 is a flow diagram, in diagrammatic form, in which another embodiment of my invention may be practiced. Figure 3 is a representation of apparatus parts in which another embodiment of my invention may be carried out. In these drawings, necessary pumps, valves, heat exchangers, etc., are not shown.

Referring now to the drawing and specifically to Figure 1, vessel 81 is a liquid-liquid contacting vessel. Vessels 86 and 93 are stripping or distillation towers.

The liquid-liquid contacting vessel 81 is equipped with liquid-liquid contact-promoting apparatus or packing of any desired type. The only requirement is that such contact-promoting or packing apparatus should effect efficient contacting between the two liquid phases passed countercurrently through this vessel. The stripping towers 86 and 93 are equipped with reboiler coils 88 and 97, respectively, and with reflux lines 101 and 102, respectively.

In the operation of the process as carried out in the apparatus of Figure 1, the extraction vessel 81 is filled with solvent such as acetonitrile or nitromethane. This solvent is introduced into the vessel through the solvent inlet line 83. When the vessel is filled with solvent and pressured sufficiently, liquid ethylene-ethane feed stock is introduced through the feed line 82. Since both ethane and ethylene are of lower specific gravity than either nitromethane or acetonitrile, the hydrocarbon liquid rises in the vessel. The downward-flowing solvent extracts the ethylene from the rising hydrocarbon. An extract phase consisting of solvent containing ethylene with some dissolved ethane is removed through the extract draw-off line 85. A subsequently recovered ethylene product is recycled through line 100 to reflux the extraction operation to produce an extract phase containing a higher concentration of ethylene and a lower concentration of the undesired ethane.

Liquid ethane containing some solvent and a minor proportion of ethylene, is withdrawn from the top of the column through the raffinate line 84. Some subsequently recovered ethane is introduced into the top of the column through the reflux line 91 for refluxing the top of the column to produce a raffinate phase of minimum ethylene content.

The raffinate phase is passed through the line 84 into the side of the stripper 86. Reboil heat may be added to the vessel from reboiler coil 88 if desired. Ethane vapor with the small amount of ethylene contained in the raffinate phase is removed from the stripper 86 through the overhead vapor line 87. These vapors are condensed in condenser 90 and the condensate is passed on through line 87A and a sufficient proportion of this condensate is passed through line 91 to reflux the raffinate end of the extractor mentioned, while the remainder of the condensate is withdrawn through line 92 as product.

Some of the condensate from line 87A may be passed through line 101 to reflux the top of the stripper 86, if desired.

The extract phase is withdrawn from the bottom of the extractor 81 through line 85 and is introduced into the side of the stripper 93. This stripper is a conventional stripping still and is operated in such a manner that the ethylene of the extract phase passes overhead as vapor through line 94. This vapor is condensed in condenser 95. One portion of the condensate may be passed through line 102 to reflux the top of the stripper 93, if desired. A second portion of this condensate is passed from line 94A through line 100 to the bottom of the extraction vessel 81 as reflux while the remaining portion of the extract is removed from the system through line 96 and is passed to storage or other disposal as desired as a main product of the process. Reboiling heat from coil 97 serves to supply the energy for separation of the extract hydrocarbons from the solvent. Coil 97 is preferably a closed coil through which steam or other heating agent is passed.

The stripped solvent is removed from the bottom of the stripper 86 through the bottoms draw-off line 89 and is combined with the solvent removed from the bottom of the stripper 93 through the bottoms draw-off line 98, and this combined stream is cooled in cooler 103 and passed on through lines 98 and 83 as solvent into the top portion of the extraction vessel 81. Makeup solvent, as needed, from a source not shown, is introduced into the system through the line 99.

The points at which the feed is introduced into the contactors and strippers may be determined according to the composition of the feed.

As mentioned above, a relatively low temperature and sufficient pressure are carried in the extraction vessel 81 to maintain liquid phase conditions.

Operating conditions in the extraction tower 81 involve conditions of temperature and pressure at which ethane and ethylene are liquid. Temperatures some lower than the maximum temperature required to maintain ethylene and ethane in the liquid state are used, the lower limit being determined by the temperature at which the solvent freezes. At the lower temperatures, correspondingly lower pressures are required. The preferred temperatures for the separation of ethylene and ethane by this liquid-liquid extraction process will be in the range from —40° to 40° F., and with sufficient pressure to maintain liquid conditions at all times in the extractor. These pressures are usually in the range of 200 to 500 pounds per square inch absolute.

It is desirable that the feed stream to the extraction process illustrated in the embodiment of Figure 1 should contain an appreciable proportion of ethylene, for example, about 20% ethylene if it is desired to produce an ethylene product of high purity. However, lower concentrations of ethylene in the feed may be employed without requiring excessive reflux ratios, if a lower purity product is satisfactory, or if a second liquid-liquid extraction step is employed.

Example I

One-hundred pounds per hour of a liquid feed comprising 50 weight per cent ethylene and 50 weight per cent ethane is introduced into an extraction tower, as contactor 81 of Figure 1, at an intermediate point, employing 760 pounds of acetonitrile as the solvent. The tower contains the equivalent of 17 theoretical plates, and is operated at a temperature of 4° F. A reflux ratio of 10:1 is maintained at the bottom of the tower, and a reflux ratio of 2:1 is maintained at the top of the tower. Under these conditions, 50 pounds of an ethylene product containing 95 weight per cent of ethylene is recovered from the extract stripper, and 50 pounds of an ethane product comprising 95 weight percent ethane is recovered from the raffinate stripper.

Example II

One-hundred pounds per hour of a liquid feed comprising 50 weight per cent ethylene and 50 weight per cent ethane is introduced into the middle of an extraction tower, as contactor 81 of Figure 1, employing 1800 pounds of nitromethane as the solvent. The tower contains the equivalent of 15 theoretical plates, and is operated at 4° F. A reflux ratio of 5:1 is maintained at the bottom of the tower, and a reflux ratio of 3.5:1 is maintained at the top of the tower. Under these conditions, 50 pounds of an ethylene product containing 95 weight per cent ethylene is recovered from the extract phase, and 50 pounds of an ethane product comprising 95 weight percent ethane is recovered from the raffinate phase.

In the apparatus illustrated in Figure 2 of the drawing, vessels 5 and 21 are absorbers, vessel 31 is a desorber or stripper having a reboiler coil 34. Vessels 54 and 71 also are stripping stills and have reboiler coils 57 and 74, respectively. Vessel 41 is a liquid-liquid contacting vessel.

The absorber vessel 5 is provided with gas-liquid contacting apparatus or packing of any desired design or type. It should, however, promote efficient contacting between liquid and gas phases in this vessel. Absorber vessel 21 is likewise equipped with an efficient gas-liquid contacting apparatus. Desorber 31 is equipped with such packing as is ordinarily used in desorbing or stripping vessels. The extractor 41 is packed with suitable liquid-liquid contact-promoting apparatus. Strippers 54 and 71 are more or less conventional stripping stills.

In the operation of the embodiment of my invention represented by Figure 2, the ethylene-containing gas to be treated is passed from a source, not shown, into this system through line 8. This gas is compressed by compressor 9 and cooled in cooler 10 and subsequently introduced into the absorber vessel 5 through line 7 at a point near its base. A normally liquid saturated paraffinic hydrocarbon such as n-heptane is introduced into the system from a source, not shown, through line 12 and it is passed on through line 11 into the absorber 5. This hydrocarbon flows downward in countercurrent relation to the upward-flowing gases. The absorbent carrying gases in solution, mainly ethane, is withdrawn from the absorber 5 through the line 14 and is introduced into the extraction vessel 41 at a point near its base. This paraffinic absorbent, while selective for saturated paraffinic hydrocarbon gases, absorbs some ethylene and smaller quantities of hydrogen and methane. Preferably substantially all of the ethane and ethylene in a feed gas are absorbed by the n-heptane. This ethane-ethylene-containing absorbent passes upward in the extraction vessel 41 in countercurrent relation to a down-flowing extraction liquid. This down-flowing extraction liquid extracts from the paraffinic absorbent the dissolved ethylene and this extractant is the acetonitrile or the nitromethane of my invention. The raffinate phase which consists of the saturated paraffinic absorbent and some selective solvent in solution along with the ethane and such lighter materials as methane and hydrogen is removed through line 42 and is passed therethrough into the stripper vessel 71 at about a mid-point. The ethane and lighter components are removed as an overhead fraction through line 72, the acetonitrile is removed as a side stream through line 65 and the paraffinic absorbent is removed through line 15 as the bottoms product of stripper 71. This bottoms material is passed through lines 15 and 11 to absorber 5. The acetonitrile is passed through lines 65, 61, cooler 62, and on through lines 63 and 43 to the top of extractor 41.

In the operation of the heptane stripper 71 since normal heptane and acetonitrile have not too widely separated boiling points, the separation of the heptane from the acetonitrile may be somewhat difficult to achieve. Since acetonitrile is soluble in normal heptane to only a very small extent, the amount of nitrile in the heptane is small and it may not be necessary to separate these materials. Under such conditions the side draw line 65 is closed and the bottoms from stripper 71 which is then a mixture of nitrile and heptane is passed through lines 15 and 11 into the absorber 5. This small amount of nitrile exhibits no detrimental effect on the absorber 5 as long as its concentration is maintained relatively low.

The extract phase which contains ethylene and only a relatively small portion of ethane is withdrawn from the extractor 41 through line 44 and if desired, is passed through lines 58 and 53 into the side of the stripper 54. If it is desired to preheat to some extent this extract phase it is by-passed from line 44 through line 51 and heating coil 52 prior to passage through line 53 into the stripper 54. This stripper is so operated that the extracted hydrocarbon consisting of ethylene with some ethane is stripped from the solvent and is passed through the overhead vapor line 55. All or a portion of these gases are passed from line 55 through line 59 and combined with the charge stock to the process in line 8. If an ethylene product of intermediate purity is desired, all or a portion of the overhead gases passing through line 55 may be withdrawn from the system through line 60 for such disposal as desired. Alternately the rich paraffinic absorption liquid may be fed into extractor 41 at an intermediate point and the lower section refluxed with a rich ethylene stream to enrich the nitrile extract phase in ethylene and produce an ethylene product stream of high purity.

The extract solvent is removed from the bottom of the stripper 54 through line 56 and is passed on through line 61, cooler 62 and lines 63 and 43 as extractant into the extractor 41. In line 61 it joins the solvent flowing through line 65 from stripper 71. Makeup solvent as needed is added to the system through line 45 from a source not shown.

If the operation is such that substantially all the ethylene is not dissolved in absorber 5, the off-gases from the original absorption step are taken overhead from the absorber 5 through line 13 and passed into an absorption vessel 21. The ethylene recovery systems represented by vessels 21 and 31 with their auxiliary parts may be any desired system or process provided, of course, the process is capable of the extraction and recovery of ethylene in a relatively pure form. As such a process, I prefer to use the ethylene absorption process involving the use of an orthoanisidine solution of cuprous chloride as disclosed in the hereinbefore mentioned application for patent. In the absorber vessel 21, a solution of 5 to 18 per cent cuprous chloride in orthoanisidine flows downward in a countercurrent relation to the upward-flowing gases. Off-gases from this absorber or from absorber 5 in case ethylene is substantially removed in it, consisting of ethane, methane, and hydrogen, are removed through the overhead vapor line 23 for such disposal as desired. This material represents one product of the process.

The absorption liquid containing its charge of ethylene is removed from the bottom of the absorber and passed through line 24 into the top of the desorption vessel 31. This desorption vessel may be substantially a stripping still, if desired. To desorb such a volatile hydrocarbon as ethylene, especially high temperatures are not required unless the desorber is to be operated under a substantial pressure. Since it is preferable to operate the desorber in this case under some pressure, the reboiler coil 34 is provided and steam is passed through this coil to furnish reboiling heat. The desorbed hydrocarbon consisting of ethylene of very high purity is removed through the overhead line 32 and this ethylene product as a main product of the process is passed to storage or to other disposal as desired. The lean absorption liquid is removed from the desorber 31 through line 33 and this material is cooled in the cooler 26 prior to passage through line 22 into the top of the absorber 21.

In the operation of the absorber 5, this absorption step may be carried out at a temperature as high as 80° F. at pressures of atmospheric or higher. I prefer, however, that the absorption step be carried out at a temperature between 20° and 50° F. and at a pressure between 150 pounds and 400 pounds p. s. i. a. The liquid-liquid extraction step in extractor 41 may be carried out under temperature and pressure conditions identical to those in the absorber 5 but constituents must be maintained in the liquid state. The conditions of operation of the strippers 71 and 54 are merely such that the hydrocarbons should be efficiently stripped from the normal heptane or from the acetonitrile without undue heating, especially of the nitrile. Since the $C_2$ hydrocarbons are quite volatile, stripping conditions need not be severe. In the operation of such an olefin recovery unit as herein disclosed, the ethylene absorber 21 may be operated at a temperature between the limits of $-22°$ F. to 86° F., when the absorption liquid is orthoanisidine containing 5 to 18 per cent cuprous chloride. Pressure in this absorber 21 may be chosen between the limits of atmospheric to 500 pounds per square inch. The ethylene desorption step carried out in stripper 31 may under some conditions be carried out merely by reduction of pressure. However, the ethylene is more nearly completely removed from this absorption liquid if desorber temperatures are maintained somewhat above atmospheric, for example from about 100° F. to 212° F. The stripper should be operated at a considerably lower pressure than the absorber 21.

Example III

In a run made according to the procedure illustrated in the accompanying flow diagram of Figure 2, the feed comprises 21 per cent recycle gas from the stripping column 54 and 79 per cent fresh feed. Analysis of this combined feed stream shows 48.5 mol per cent hydrogen, 12.9 mol per cent methane, 22.2 mol per cent ethylene, and 16.4 mol per cent ethane. 100 mols of feed of this composition is passed countercurrently to 100 mols per hour of normal heptane in an absorber tower having the equivalent of 14 theoretical plates. The pressure in this tower is 300 pounds per square inch absolute and the temperature is maintained at 32° F. Unabsorbed gas is removed overhead from the absorber at the rate of 68.7 mols per hour.

The n-heptane absorber liquid, containing 31.3 mols of absorbed gas per 100 mols of n-heptane is then passed to a fractional distribution tower 41 having the equivalent of 14 theoretical plates and contacted countercurrently with 328 mols of acetonitrile per 100 mols n-heptane. Conditions of pressure and temperature in this step are the same as in the absorber tower, namely 300 pounds per square inch absolute and 32° F. Here the ethylene is extracted by the acetonitrile, the ethane being retained in the n-heptane. From the fractional distribution step the acetonitrile-ethylene liquid as extract and the n-heptane-ethane as raffinate are withdrawn and conveyed to their respective stripping towers in which the absorbed gases are removed by elevating the temperature and reducing the pressure. The lean solvents are then recirculated to the fractional distribution and absorption steps.

The gaseous overhead product from the heptane stripper can be used as a source of 93 per cent ethane by removal of the light gases present, or it can be used as a cracking stock without further treatment. The gaseous overhead from the acetonitrile stripper, when combined with 79.4 mols per hour of fresh feed maintains the composition of the feed stream introduced into the absorber at the constant level mentioned.

Table I gives the material balance at several points in the process illustrated by Figure 2 using the feed stock and operating conditions given above (Example III).

TABLE I

| Raw Charge Gas | Recycle Gas from Stripper 54 | 100 Mols—Combined Feed to Absorber 5: 21% Raw Charge —79% Recycle Gas from 54 | 68.7 Mols—Off Gas from Absorber 5—Feed to $C_2H_4$ Recovery | 10.7 Mols—n-Heptane Stripper Overhead [1] | 20.6 Mols—Acetonitrile Stripper Overhead [1] |
|---|---|---|---|---|---|
| | Mol percent | Mol percent | Mol percent | Mol percent | Mol percent | Mol percent |
| $H_2$ | 60.6 | 1.9 | 48.5 | 69.2 | 4.7 | 1.9 |
| $CH_4$ | 15.3 | 3.3 | 12.9 | 15.5 | 14.0 | 3.3 |
| $C_2H_4$ | 12.1 | 61.5 | 22.2 | 13.1 | 5.6 | 61.5 |
| $C_2H_6$ | 12.0 | 33.3 | 16.4 | 2.2 | 75.5 | 33.3 |

[1] On a solvent-free basis.

In the apparatus illustrated in Figure 3 of the drawing, a vessel 111 is a liquid-liquid contacting vessel which is provided with suitable liquid-liquid contact promoting apparatus or packing. Vessel 135 is a gas-liquid contacting vessel in which two immiscible liquids and a gas are contacted with the aid of suitable internal packing. Towers 118, 131, 140 and 145 are more or less conventional stripping stills and they are equipped with reboiler coils 125, 134, 144 and 143, respectively.

In the operation of the embodiment of my invention represented by Figure 3, a liquid charge stock consisting of ethylene and ethane is passed through the feed line 112 from a source, not shown, into the side of the contactor vessel 111. This vessel has, of course, previously been filled with a solvent or extraction liquid for extracting one of the constituents of the feed stock. This extraction liquid is introduced into the top of the vessel through the line 113 and on passing downward from its inlet point to the feed point contacts the upward rising liquid charge stock. In this upper portion of the vessel the solvent dissolves or extracts ethylene from the ethylene-ethane mixture when an ethylene selective solvent is used. Some little ethane is also dissolved. The solvent with its charge of $C_2$ hydrocarbons passes on downward in the vessel 111 and finally leaves the vessel through the line 115. Under certain conditions liquid ethylene may be introduced into the bottom of the vessel through line 116 or line 117 for refluxing purposes to improve the quality of the final product.

Liquid ethane substantially free from ethylene is removed from the top of the extractor vessel 111 as a raffinate phase and is passed through line 114 into the side of the stripper vessel 118. This vessel is operated under conditions so that the dissolved ethane is distilled from the relatively small amount of solvent which is carried into the stripper as a minor component of the raffinate phase. The ethane is removed from the top of the stripper through line 120 and is passed on through line 123 for such disposal as desired. Heat for reboiling purposes is added through the reboiler coil 125. If desired a portion of the raffinate phase passing through line 114 may be passed through lines 119 and 113 into the top of the extractor 111 as reflux. The solvent is removed from the reboiler section of the stripper 118 through the line 121 and is passed on through lines 122 and 113 into the top of the extractor.

The extract phase removed from the extractor through line 115 is passed into the stripper 131 in which the ethylene is separated from the solvent. The solvent is withdrawn from the bottom of the stripper through line 133, combined with the recovered solvent from the stripper 118, and passed through line 122, cooler 128 and line 113 into the top of the extractor. The ethylene from the stripper 131 is removed through line 132 and introduced into the side of the absorber 135. If desired, a portion of the ethylene-rich vapor from line 132 may be bypassed through line 116 and condenser 130 and introduced into the bottom of the extractor as reflux. Since the extractor vessel 111 is operated in such a manner as to produce an ethane stream substantially free of ethylene some little ethane will be dissolved in the extract phase and of course is removed with the ethylene in line 132 from the stripper 131.

Two immiscible solvents are introduced into opposite ends of the absorber 135. The solvent introduced through line 138 into the top of this absorber is chosen to be selective for the absorption of ethylene while the solvent introduced into the bottom of the absorber through line 139 is chosen to be selective for the absorption of ethane. The charge gas to this absorber upon entering is contacted with the downflowing ethylene absorbent and with the upflowing ethane absorbent in such a manner that each absorbent dissolves the particular hydrocarbon for which it is selective. The ethylene-rich absorption liquid is removed through line 137 and passed into the stripper 145 in which the ethylene is separated from the solvent. The ethylene is removed from this vessel through line 117, condensed in the condenser 147, and passed on through line 124 for storage or other disposal if desired. A portion of this liquid ethylene-rich stream, however, may be passed through line 117 into the bottom of the original extraction vessel as reflux to promote production of an ethylene product of higher purity. The solvent free from ethylene is removed from the stripper 145 through line 138, cooled in cooler 148 and passed into the top of the absorber vessel 135 as the ethylene selective solvent. Makeup ethylene selective solvent may be introduced into the system through lines 126 and 127 from sources, not shown, and as needed. Reboiling heat is added from coil 143.

The ethane selective solvent with its charge of dissolved ethane is removed from the top of the absorber 135 and is passed through line 136 into the stripper 140 for removal of the ethane. Heat for reboiling purposes is added through the reboiler coil 144. The ethane product is removed overhead through line 141 and it may be combined with the ethane flowing through line 120 and the combined stream passed through line 123 to storage or other disposal. However, if this ethane product originating in stripper 140 contains an appreciable proportion of ethylene or if the ethylene content is about the same as that of the original feed stock in line 112 all or a portion of this ethylene may be bypassed from line 141 through condenser 150 in line 142 to be charged with the original feed stock to the primary extraction step. The solvent freed from its ethane content is removed from the stripper 140 through line 139 and is cooled in cooler 149 and passed into the bottom of the absorber vessel 135 as the ethane selective solvent. Makeup solvent for ethane may be introduced into the system through line 146 as needed.

If desired, and this is preferable with relatively rich ethylene feed streams, say 40 or more per cent ethylene, the first extraction step may be omitted, bypassing tower system 111 and passing the feed directly to the fractional distribution tower 135. The latter may also be satisfactorily operated as a liquid phase fractional distribution tower only by employing proper temperature-pressure conditions to liquefy the $C_2$ hydrocarbon stream and feeding this as liquid. Under some conditions this has advantages in simplifying the internal design of the tower 135. In any case sufficient quantities of the two solvents and in such ratio to dissolve completely all of the feed stream so that only one liquid phase leaves at each end of the tower are employed.

As the ethylene selective solvent for use as the extraction solvent in the extractor 111 and as the ethylene absorbent in the absorber 135, I prefer to use either of my novel solvents, acetonitrile or nitromethane. The ethane selective absorbent used in the absorber 135 is preferably normal heptane but may be $C_6$ to $C_9$ normal paraffin hydrocarbons.

Operating conditions in the extraction tower 111 involve temperatures and pressures such that ethane and ethylene are maintained in the liquid state. While the maximum temperature will be so limited that at the pressure maintained, the $C_2$ hydrocarbons are in the liquid state, any temperature lower than this level may be employed, limited only by the freezing point of the solvent used. Obviously, with lowered temperatures, pressures can be correspondingly reduced. As a practical operating range of temperatures for this step, I prefer those between —40° and 40° F., with pressures in the range between 200 and 500 pounds per square inch absolute.

In the fractional distribution step in absorber 135, tempertures up to about 80° F. and pressures at atmospheric or higher are involved. I prefer to carry out this step at a temperature in the range between —13° and 50° F., with a pressure between 100 and 400 pounds per square inch absolute. These operating conditions will be determined to some extent by the particular solvent pair employed. With acetonitrile and n-heptane temperatures of 5° to 35° F. with pressures of 100 to 150 pounds have usually provided best results when the tower temperature is kept uniform over its length. In some cases advantages are gained by operating the fractional distribution tower with a temperature differential between top and bottom. For example, with the above solvent pair the results are improved by maintaining the ethylene rich end of the tower 135 at approximately —13° to 5° F. while the ethane rich end is maintained at about 20° to 50° F. and at pressures of about 100 to 150 pounds.

The procedures employed in the stripping towers will be carried out according to methods and conditions well known in the art. In general, stripping may be effected by means of elevated temperatures and/or reduced pressures, although a stripping medium such as steam, or a selective solvent such as ethylene glycol, or the like may be employed when desired.

In the recovery of ethylene from ethane-ethylene streams, the mixture fed to the process will contain at least five per cent ethylene and should be substantially free from hydrogen, methane, and $C_3$ or higher molecular weight hydrocarbons. Reactive constituents such as hydrogen sulfide, carbon monoxide and the like should also be removed prior to introduction of the feed into the process.

In some instances it may be preferable to pass the liquid ethylene-ethane stream directly to a two-solvent liquid-liquid distribution tower. The stream is introduced at an intermediate point in this tower and therein contacted with countercurrently flowing paraffinic solvent and acetonitrile or nitromethane, the paraffin solvent being fed to the bottom of the column and the ethylene selective solvent to the top. Reflux may or may not be used. By so operating, separation of the ethylene from the ethane is effected in a single unit. Recovery of the ethylene and the ethane from the individual solvents can be effected by conventional means. It is advantageous to operate the tower with a temperature differential between the two ends, that employed for ethylene extraction being at the lower temperature level. The temperature limits in the two zones are from 30° to 50° F. at the point of withdrawal of paraffinic solvent when operating with n-heptane and between −13° and +5° F. at the point of withdrawal of ethylene selective solvent when operating with acetonitrile.

The fractional distribution as described in the preceding paragraph may be carried out in a single stage or in a manner such that ethylene is partially enriched in a first step, say to about 60 per cent, at a given temperature level, and the separation completed in a second step at a lower temperature level. By so operating it is possible to realize the advantages of a high average distribution factor throughout the process.

*Example IV*

In a run made according to the procedure illustrated in the flow sheet of Figure 3, the feed comprises 614 pounds of ethylene and ethane of which 43 weight per cent is ethylene. The solvent supplied to extraction tower 111 is 7390 pounds of acetonitrile. Reflux ratios of 4:1 and 5:1 are maintained at the top and bottom of the tower, respectively. The tower contains the equivalent of six theoretical equilibrium stages and is maintained at a temperature of 5° F. and a pressure of approximately 300 pounds per square inch absolute. Under these conditions 436 pounds of an ethane-ethylene mixture comprising 75 weight per cent ethylene are removed from stripper 131 and 345 pounds of ethane of 97.5 per cent purity are recovered from stripper 118. The fractional distribution tower 135 contains the equivalent of 10 theoretical equilibrium stages and is supplied with 1945 pounds of acetonitrile via line 138 and 1295 pounds of n-heptane via line 139. The temperature in this tower is maintained at 32° F. and the pressure, at 315 pounds per square inch absolute. The gaseous stream obtained from stripper 140 comprises 166 pounds of an ethane-ethylene mixture having approximately the same composition as the feed to tower 111 and is accordingly recycled via lines 142 and 112. The gaseous stream from the stripper 145 comprises 269 pounds of ethylene having a purity of 95 weight per cent, which stream is the primary product of the process. In this case reflux to the bottom of tower 111 is supplied from the 75 weight per cent ethylene stream via line 116 and not high purity ethylene via line 117.

*Example V*

The feed conditions and operating conditions of temperature and pressure are the same as those for Example IV. However in this case reflux to the bottom of tower 111 is supplied via line 117 as a portion of the high purity ethylene product. Also the fractional distribution tower 135 yields high purity ethane as the overhead product eliminating the recycling of ethane in lines 142 and 112. Under these conditions 614 pounds of feed yield 211 pounds of 97.5 per cent ethane from stripper 118 via lines 120 and 123 and 134 pounds of 97.5 ethane via line 141 from stripper 140. The solvent supplied to tower 111 comprises 1650 pounds of acetonitrile, whereas 4105 pounds of acetonitrile and 2000 pounds of n-heptane are supplied to tower 135. The feed to tower 135 comprises 583 pounds of a gaseous stream containing 75 weight per cent ethylene and 25 weight per cent ethane. Reflux to the bottom of tower 111 via line 117 consists of 180 pounds of ethylene of 95 weight per cent purity and the principal product of the process is 269 pounds of ethylene of 95 weight per cent purity.

The above-described flow systems are given for illustrative purposes and should not be regarded as limiting the invention, the scope of which is set forth in the following claims.

Having described my invention, I claim:

1. A process for the separation and recovery of ethylene from a gaseous mixture of ethylene and ethane and containing such other constituents as methane and hydrogen comprising admixing said gaseous mixture with a liquid saturated paraffinic hydrocarbon selected from the group of saturated paraffinic hydrocarbons containing 6 to 9 carbon atoms per molecule as an absorbent, subjecting said admixture to liquid-gas absorption conditions, separating the admixture into a liquid phase rich in ethane and containing some ethylene and said other constituents and a gas phase enriched in ethylene; extracting said liquid phase rich in ethane and containing some ethylene and said other constituents with a liquid extraction solvent selected from the group consisting of monosubstituted methanes containing the substitution groups —NO$_2$ and —CN under liquid-liquid extraction conditions, from the extraction operation separating said liquid saturated paraffinic hydrocarbon rich in ethane and containing a portion of said other constituents as a first liquid phase and said liquid extraction solvent rich in ethylene and containing some ethane and another portion of said other constituents as a second liquid phase, subjecting said second liquid phase to stripping conditions and recovering therefrom said extraction solvent and returning the recovered extraction solvent to the extraction operation, also recovering stripped gases rich in ethylene and recycling same into the gaseous feed to the process, subjecting said first liquid phase to stripping conditions, recovering said liquid saturated paraffinic hydrocarbon from this latter stripping operation and recycling same to the first admixing step as said liquid paraffinic hydrocarbon, also recovering stripped gases rich in ethane and containing some methane and hydrogen from this latter stripping operation as a minor product of the process, recovering the ethylene by contacting said gas phase enriched in ethylene with a solution comprising ortho-anisidine and 5 to 18 per cent cuprous salt at a temperature between the limits of —22° F. to 86° F. under a pressure between the limits of atmospheric to 500 pounds per square inch gauge, from this contacting operation separating a gas phase rich in ethane and containing methane and hydrogen as a portion of the secondary product of the process and a liquid phase comprising a cuprous salt-orthoanisidine solution of ethylene, subjecting this latter solution to desorption conditions, recovering cuprous salt-orthoanisidine solution, returning same to its contacting operation and recovering ethylene as the main product of the process.

2. The process of claim 1 wherein said liquid solvent selected from the group consisting of monosubstituted methanes containing the substitution groups —NO$_2$ and —CN is acetonitrile.

3. The process of claim 1 wherein said liquid solvent selected from the group consisting of monosubstituted methanes containing the substitution groups —NO$_2$ and —CN is nitromethane.

4. The process of claim 1 wherein said liquid saturated paraffinic hydrocarbon is n-heptane.

References Cited in the file of this patent

UNITED STATES PATENTS

| | | |
|---|---|---|
| 1,422,183 | Curme | July 11, 1922 |
| 1,452,322 | Stewart | Apr. 17, 1923 |
| 2,023,375 | Van Dijck | Dec. 3, 1935 |

(Other references on following page)

UNITED STATES PATENTS

| | | |
|---|---|---|
| 2,159,175 | Cunradi et al. | May 23, 1939 |
| 2,338,600 | Robey et al. | Jan. 4, 1944 |
| 2,433,751 | Friedman | Dec. 30, 1947 |
| 2,445,520 | Woodbury et al. | July 30, 1948 |
| 2,508,723 | Mayland et al. | May 23, 1950 |
| 2,515,217 | Hachmuth | July 18, 1950 |
| 2,526,971 | Ray | Oct. 24, 1950 |
| 2,552,198 | Mayland et al. | May 8, 1951 |

FOREIGN PATENTS

| | | |
|---|---|---|
| 441,104 | Great Britain | Jan. 13, 1936 |